US007890503B2

(12) United States Patent
Murarka et al.

(10) Patent No.: US 7,890,503 B2
(45) Date of Patent: Feb. 15, 2011

(54) METHOD AND SYSTEM FOR PERFORMING SECONDARY SEARCH ACTIONS BASED ON PRIMARY SEARCH RESULT ATTRIBUTES

(75) Inventors: Neel I. Murarka, Cupertino, CA (US); Michael A. Belshe, Sunnyvale, CA (US); Steven W. Ickman, Redmond, WA (US); David Dawson, Seattle, WA (US); Dane A. Glasgow, Los Gatos, CA (US)

(73) Assignee: Microsoft Corporation, Redmond, WA (US)

( * ) Notice: Subject to any disclaimer, the term of this patent is extended or adjusted under 35 U.S.C. 154(b) by 387 days.

(21) Appl. No.: 11/052,585

(22) Filed: Feb. 7, 2005

(65) Prior Publication Data

US 2006/0179039 A1 Aug. 10, 2006

(51) Int. Cl.
*G06F 17/30* (2006.01)
*G06F 7/00* (2006.01)
(52) U.S. Cl. ........................... 707/728; 707/731
(58) Field of Classification Search ................... None
See application file for complete search history.

(56) References Cited

U.S. PATENT DOCUMENTS

| | | | | |
|---|---|---|---|---|
| 5,717,914 A | * | 2/1998 | Husick et al. | 707/5 |
| 6,385,602 B1 | * | 5/2002 | Tso et al. | 707/3 |
| 7,299,222 B1 | * | 11/2007 | Hogan et al. | 707/3 |
| 2002/0131362 A1 | * | 9/2002 | Callon | 370/216 |
| 2003/0212673 A1 | * | 11/2003 | Kadayam et al. | 707/3 |
| 2004/0083211 A1 | * | 4/2004 | Bradford | 707/3 |
| 2004/0186827 A1 | * | 9/2004 | Anick et al. | 707/3 |
| 2005/0044076 A1 | * | 2/2005 | Wu et al. | 707/4 |
| 2005/0055271 A1 | * | 3/2005 | Axe et al. | 705/14 |
| 2005/0187951 A1 | * | 8/2005 | Chen et al. | 707/100 |
| 2005/0222901 A1 | * | 10/2005 | Agarwal et al. | 705/14 |
| 2005/0240580 A1 | * | 10/2005 | Zamir et al. | 707/4 |
| 2005/0246324 A1 | * | 11/2005 | Paalasmaa et al. | 707/3 |
| 2005/0289120 A9 | * | 12/2005 | Soulanille et al. | 707/3 |
| 2006/0031215 A1 | * | 2/2006 | Pong Robert | 707/4 |
| 2006/0101074 A1 | * | 5/2006 | Cancilla et al. | 707/104.1 |
| 2006/0218184 A1 | * | 9/2006 | Scholl et al. | 707/104.1 |
| 2007/0106639 A1 | * | 5/2007 | Subramaniam et al. | 707/3 |

* cited by examiner

*Primary Examiner*—Cam Y Truong
*Assistant Examiner*—Dung K Chau
(74) *Attorney, Agent, or Firm*—Shook Hardy & Bacon LLP (57) ABSTRACT

A method and system are provided for enhancing an initial set of data values generated by a query of one or more data stores. File parameters and file types are retrieved from the initial query and used to generate a second set of searches, actions, and information related to the initial set of data values. The results from the initial query and the secondary query are displayed on a presentation device.

12 Claims, 10 Drawing Sheets

METHOD AND SYSTEM FOR PERFORMING SECONDARY SEARCH ACTIONS BASED ON PRIMARY SEARCH RESULT ATTRIBUTES

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

Embodiments of the present invention relate to the field of network-based and desktop searches of local and network data stores. More particularly, but not by way of limitation, embodiments of the present invention provide a new and useful method and system of enhancing initial search results based on data types and properties returned by the initial search.

BACKGROUND OF THE DISCLOSURE

Many computer-related applications allow the ability to perform keyword searches for information located on a data store or data stores. Applications such as email programs, word-processing programs, and Internet browsers offer various search capabilities. In relation to browsers, with the wealth of information that may be found on the Internet, various search engines are utilized for keyword searching of the Internet for content specific to the keywords which are inputted into the search engine. A typical search engine generates a set of search results based on the occurrence of the keywords in web pages or meta-tags within web pages.

In addition, desktop applications, such as email programs, allow similar searches to be performed using keywords to generate a list of files including the keyword. For example, an e-mail program may allow searching of an inbox for a sender's e-mail address, a recipient's e-mail address, or keywords occurring in subject lines. Results having only those parameters defined in the keyword search are displayed.

These types of keyword searches do not display additional information that may be relevant to the search. With an Internet browser keyword search, if the keywords are non-specific or wrong, irrelevant search results may be returned. For example, if a search is performed for an illness originating in a hospital, the keywords "illness originating in a hospital" might be used. Results referring to various illnesses and "originating hospitals" might be returned. However, the keyword search was intended to find results pertaining to nosocomial illnesses, or secondary disorders associated with being treated in a hospital, such as staph infections, but unrelated to a patient's primary condition, which may be a broken arm. Thus, the initial search did not provide useful results. In another example, a search for emails sent from a particular individual in an email program may return the emails set from the individual, but no further information, such as the individual's company information, and suggested additional actions and searches are returned.

Current search technologies are, in general, inefficient and ineffective. There is a need in the art to provide enhanced searching capabilities when searching local or network data stores. An enhancement of searching capabilities would greatly increase the efficiency and effectiveness of searching, while suggesting additional action which may be beneficial to the original search.

BRIEF SUMMARY OF THE DISCLOSURE

Embodiments of the present invention provide a novel method and system for enhancing keyword searches of local and network data stores. More particularly, but not by way of limitation, embodiments of the present invention provide a user performing a keyword search of a local and/or a network data store additional searches, actions, and information based on the properties and file types returned in the initial search. Embodiments of the present invention may have several practical applications in the technical arts, including, but not limited to, enhancing network-based and desktop searching thereby increasing the effectiveness and efficiency of search capabilities.

In one embodiment, a method is provided for enhancing a data store query. The method comprises providing initial sets of data values responsive to a query of several data stores, generating related sets of data values based on characteristics of portions of the initial set of data values, and refining the initial set of data values based on the characteristics found in the portion of the initial set of data values. Finally, the initial set of data values and refined set of data values are presented on a presentation device.

In another embodiment, a computer system having a graphical user-interface including a display and a user-interface selection device is provided for generating one or more options relating to a data store query. The method comprises generating one data set responsive to an input data string, and based on the attributes of the generated data set, producing associated data sets. The method further comprises presenting the generated data set and a portion of the display and based on the associated data sets having a percentage of attributes exceeding a threshold, presenting options and one or more portions of the display.

In yet another embodiment, a computer readable media having computer-useable instructions embodied thereon performs a method of providing additional selections related to an initial search of several data stores. The method comprises querying the data stores in response to an input data string or keyword, where initial data values are returned in response to the query. The method further comprises deriving from the initial data values one or more characteristics, and if an occurrence of a characteristic exceeds a predetermined threshold, the method re-queries the data stores based on the characteristics and returns several secondary data values in response to the re-query. Finally, the initial data values and the secondary data values are displayed on a presentation device.

Additional features are described in greater detail below.

BRIEF DESCRIPTION OF THE SEVERAL VIEWS OF THE DRAWING

Embodiments of the present invention are described in detail below with reference to the attached drawing figures, which are incorporated in their entirety by reference herein and wherein.

DETAILED DESCRIPTION OF THE DISCLOSURE

Embodiments of the present invention provide a novel method and system for enhancing an initial query of one or more data stores by refining the initial query using similar file types and similar file properties found in the initial query. The novel method and system illustrated in the various embodiments of the present invention may, in some embodiments, perform a noun extraction wherein reoccurring phrases or words found in the initial results, but not found in the initial query, may be used to create a second query using the words or phrases extracted from the results of the initial query. Moreover, in some embodiments, common file types returned in the initial query may be used to provide additional searches, actions, and information related to the initial query. In other embodiments, noun-extraction and common file types may be used to enhance an initial query. Thus, embodiments of the present invention enhance results returned by an initial keyword search of a data store or data stores by using common file types and file properties. Although noun extraction and common file types are utilized to explain enhancement of an initial query returning primary search results, the scope of various embodiments of the present invention are not limited to the aforementioned enhancement techniques.

Embodiments of the present invention will be better understood from the detailed description provided below and from the accompanying drawings of various embodiments of the invention. The detailed description and drawings, however, should not be read to limit the invention to the specific embodiments. Rather, these specifics are provided for explanatory purposes to help the invention to be better understood.

Specific hardware devices, programming languages, components, processes, and numerous details including operating environments and the like are set forth to provide a thorough understanding of the present invention. In other instances, structures, devices, and processes are shown in block diagram form, rather than in detail, to avoid obscuring embodiments of the present invention. But an ordinary-skilled artisan would understand that embodiments of the present invention may be practiced without these specific details. Computer systems, servers, workstations, and other machines may be connected to one another across the communications medium including, for example, a network or network of networks.

A network may be, but is not limited to, either an Internet network, intranet network, local area network (LAN), metropolitan area network (MAN), wide area network (WAN), or combination thereof without limiting the scope of various embodiments of the present invention. Further, illustrative data stores used to explain various embodiments of the present invention may include, but are not limited to, data structures comprising databases, spreadsheets, text documents and any other structure capable of being a data storage medium. Moreover, computing systems capable of utilizing the various embodiments of the present invention include, but are not limited to, personal digital assistants (PDAs), personal computers, servers, workstations, and other machines.

Figure 1:
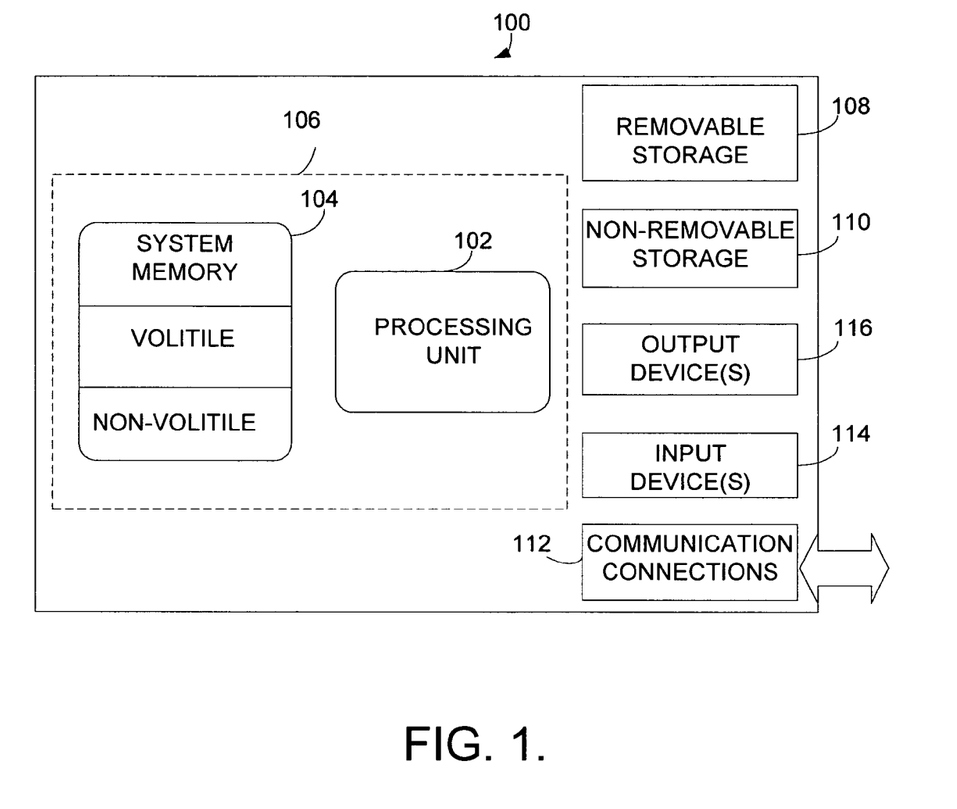
FIG. 1 is an embodiment of an exemplary operating environment.

Turning to FIG. 1, there is illustrated an exemplary embodiment of a computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include, but are not limited to, routines, programs, objects, components, and data stores that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Turning again to FIG. 1, an exemplary system includes a computing system, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination thereof. This most basic configuration is illustrated in FIG. 1 by dashed line 106. Additionally, device 100 may also have additional features/functionality. For example, device 100 may also include additional storage (removable and/or non-removable) including magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data stores, program modules or other data. Memory 104, removable storage 108 and non-removable storage 110 are all examples of computer storage media. Computer storage media includes RAM, ROM, EEPROM, flash memory or other memory, CD-ROM, digital versatile disks (DVD) or other optical storage, magnetic cassettes, magnetic tape, magnetic disk storage or other magnetic storage devices which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data stores, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, etc. Output device(s) 116 such as a display, speakers, printer, etc. may also be included. All these devices are well know in the art and need not be discussed at length here.

Figure 2:
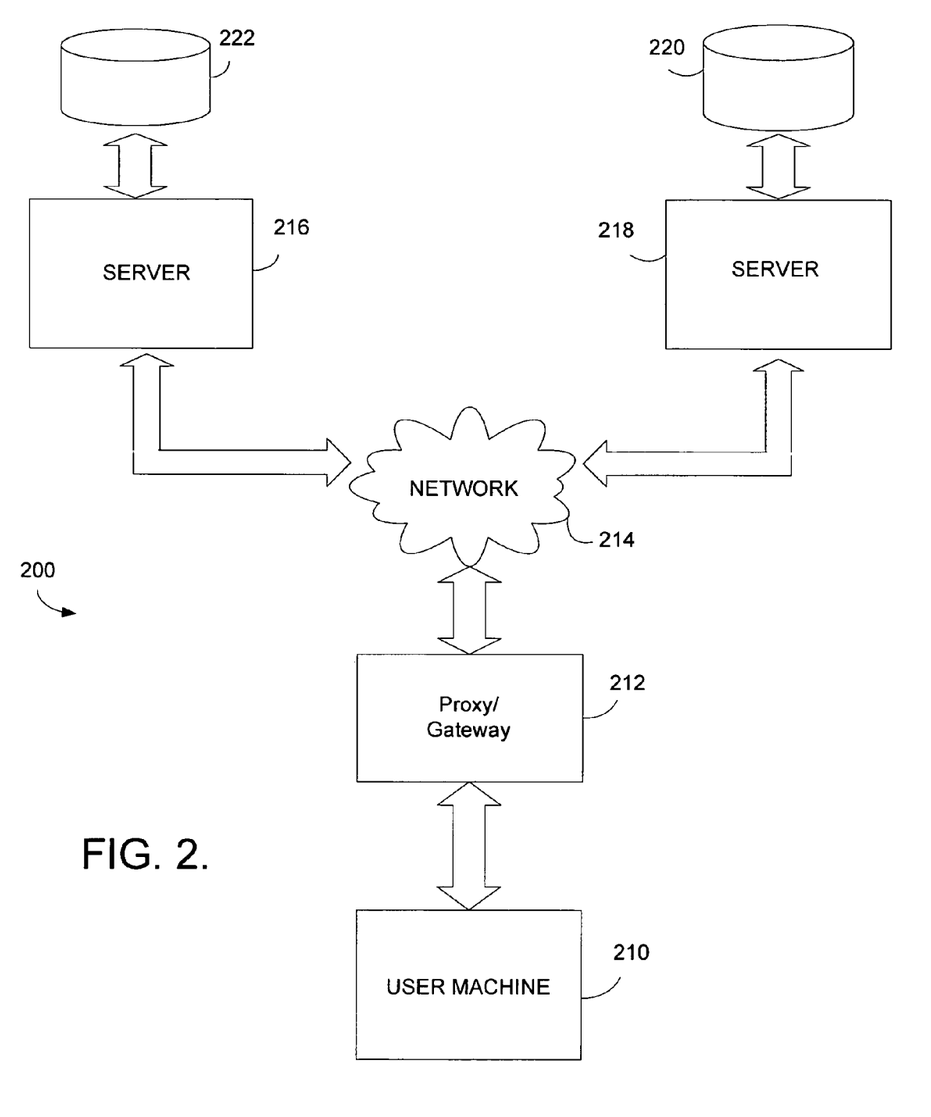
FIG. 2 is a block diagram of an embodiment of a network-based search.

Turning now to FIG. 2, there is illustrated an exemplary embodiment 200 of a network-based search architecture. A user-machine 210, such as computing device 100 illustrated in FIG. 1, communicates with a network 214 via a proxy server or gateway 212. User-machine 210 may be a personal computer, work station, personal digital assistant (PDA), or any other machine capable of performing a network-based search. Network 214 may be an Internet, an Intranet, LAN, MAN, or WAN.

User-machine 210 procures information from data stores 222 and 220, which may be located external from user-machine 210 on servers 216 and 218. Data stores 222 and 220 may comprise, but are not limited to, data structures comprising data such as text, HTML, and XML documents, music or video files or any other data capable of being stored on a data store. Although embodiment 200 illustrates one network 214, two servers 216 and 218, and two data stores 222 and 220, any number of data stores, serves, or networks may be utilized without limiting the scope of embodiments of the present invention.

In operation, a keyword search request for information on data stores 220 and 222 is initiated by user-machine 210. Servers 216 and 218 receive the keyword search request via network 214 and return relevant information from data stores 222 and 220 to user-machine 210. The information is then displayed on a presentation device (not shown) and utilized by a user of user-machine 210. In accordance with exemplary methods illustrated in FIGS. 4-8, further enhancement of the information may comprise additional keyword requests for information on data stores 220 and 222.

Figure 3:
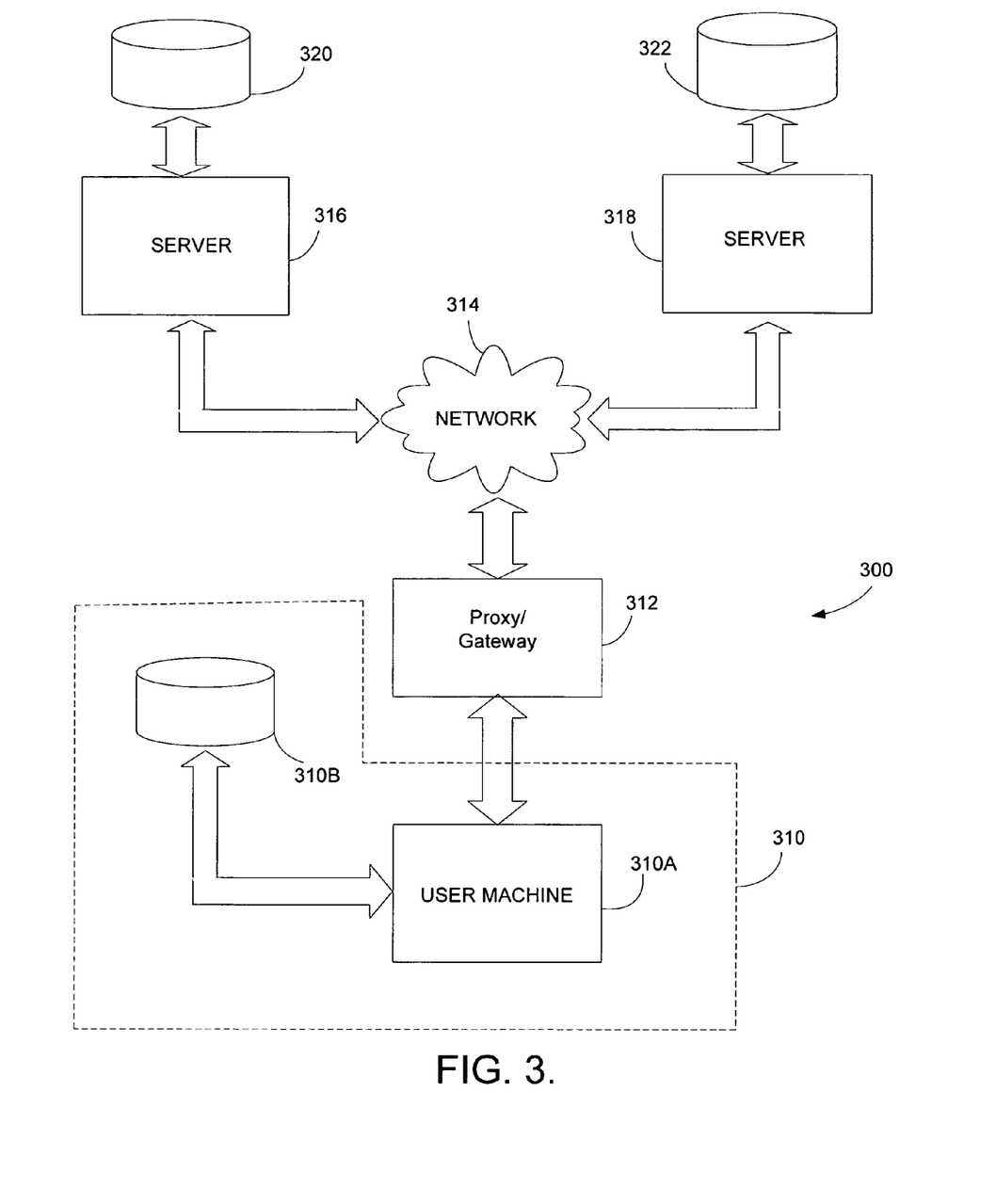
FIG. 3 is a block diagram of an embodiment of a desktop search combined with a network-based search.

Referring now to FIG. 3, there is illustrated an exemplary embodiment 300 of a desktop search architecture in combination with a network-based search architecture. A computing system 310 comprises a user-machine 310A and a user data store 310B. User-machine 310A communicates with a network 314 via a gateway 312 to servers 318 and 316. Servers 318 and 316 comprise data stores 322 and 320 that may include, but are not limited to, data structures comprising data such as text, HTML, and XML documents, music and vide files or any other data capable of being stored on a data store. Although embodiment 300 comprises one network 314, two servers 316 and 318, and data stores 320 and 322, multiple networks, servers, and data stores may be utilized in other embodiments without limiting the scope of embodiments of the present invention.

In operation, a keyword search is performed on user data store 310B and optionally on data stores 320 and 322 through network 314. Information returned from user data store 310B may be enhanced by additional queries of data stores 320 and 322 in accordance with the embodiments of enhancement methods illustrated in FIGS. 4-8.

Figure 4:
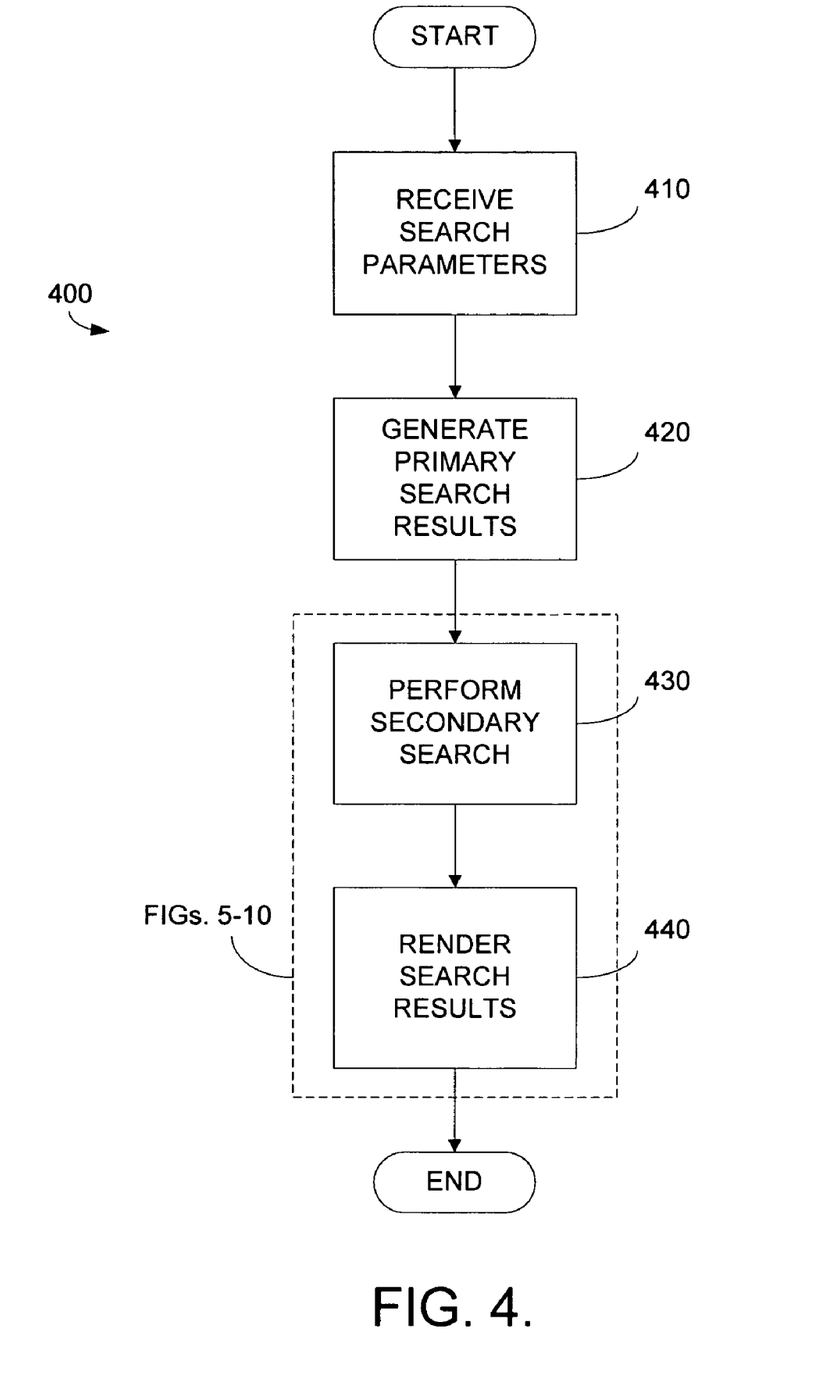
FIG. 4 is a flow chart illustrating a general overview of one embodiment of a method for enhancing search results.

Turning now to FIG. 4, there is illustrated one embodiment of a method 400 for enhancing search results. The embodiment of an enhancement method illustrated by method 400 may utilize, but is not limited to, the exemplary architectures of FIGS. 2-3. As shown at 410 a search parameter or data string is entered into a network search application or a desktop search application. A network search application may be, but is not limited to, an internet browser application. A desktop search application may be, but is not limited to, an email application. At a step 420 search results, such as HTML and text documents, from a network-based search or desktop search are returned. At a step 430, a secondary search is performed that may use, among other attributes, file properties and file types retrieved form the primary search results generated at step 420. At a step 440 the search results, either primary and/or secondary, are displayed in, for example, a display device having a graphical user-interface and a user selection device. The methods comprising steps 430 and 440 are illustrated in greater detail in FIGS. 5-10.

Figure 5:
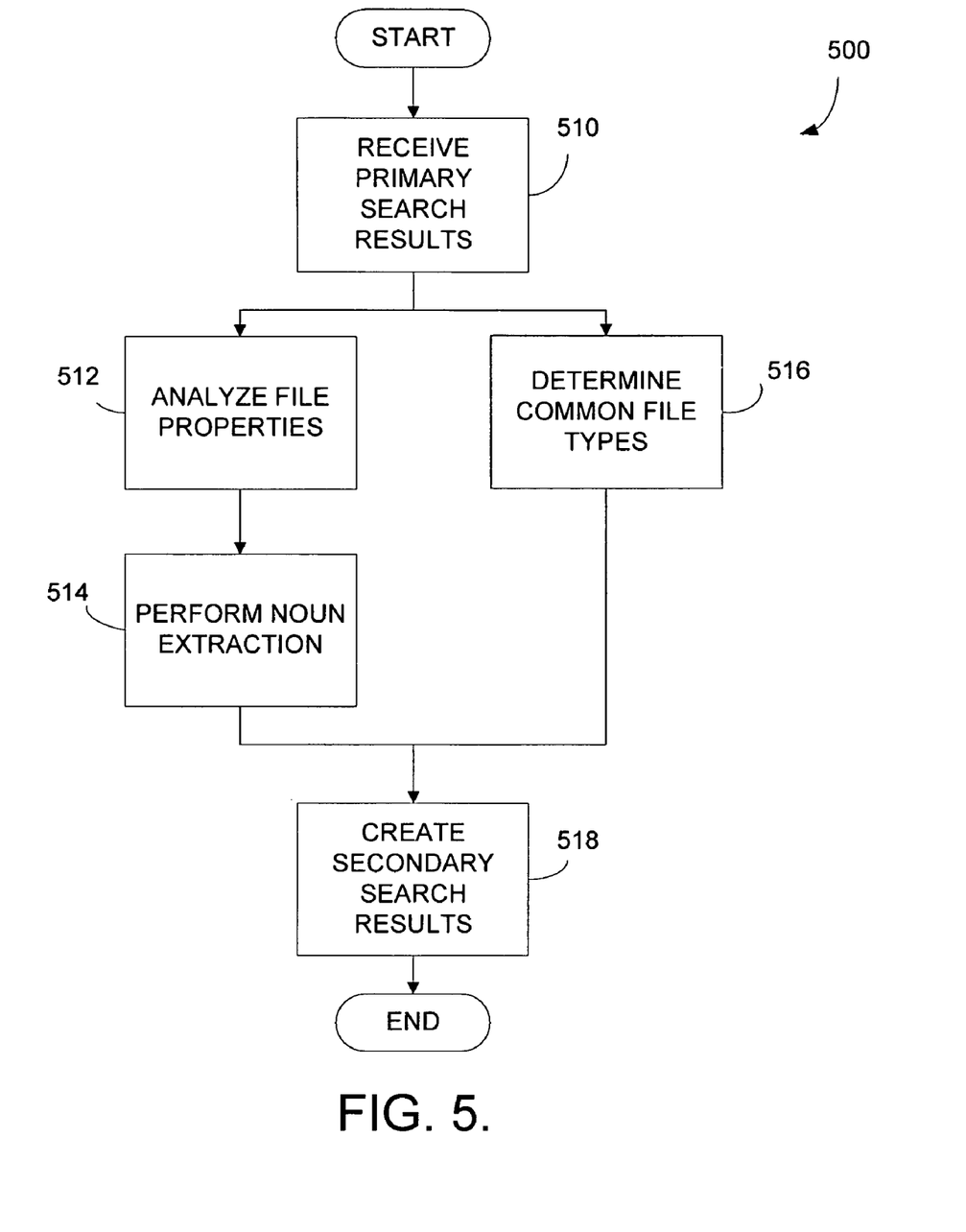
FIG. 5 is a more detailed flow chart illustrating one embodiment of a method for refining initial search results.

Referring now to FIG. 5, there is illustrated one embodiment of a method 500 for generating secondary or enhanced search results. At 510 primary search results or results from the initial network-based or desktop query are retrieved. At a step 512, file properties from the search results generated in the primary search are analyzed. File properties include, but are not limited to, reoccurring words or phrases in the data included in the primary search. Other file properties may by, but are not limited to, domain strings in email addresses. At a step 514 a technique known in the art as "noun extraction" is performed on the primary search results. Noun extraction involves extracting nouns from data included in the primary search results. File property analysis may be useful in enhancing the primary search to suggest additional searches and actions or displaying additional information related to the primary search. Other analysis performed on the primary search results is an analysis of common file types at 516. Step 516 determines what types of files are generated in the primary search. For example, common file types may indicate the primary search was directed toward specific content. For example, if files with .".WMV" or .".AVI" extensions reoccur in the primary search results, this may indicate the search was directed toward music files or video files. At 518, a secondary search result list is created that comprises the various file properties and file types from the primary search results.

Figure 6:
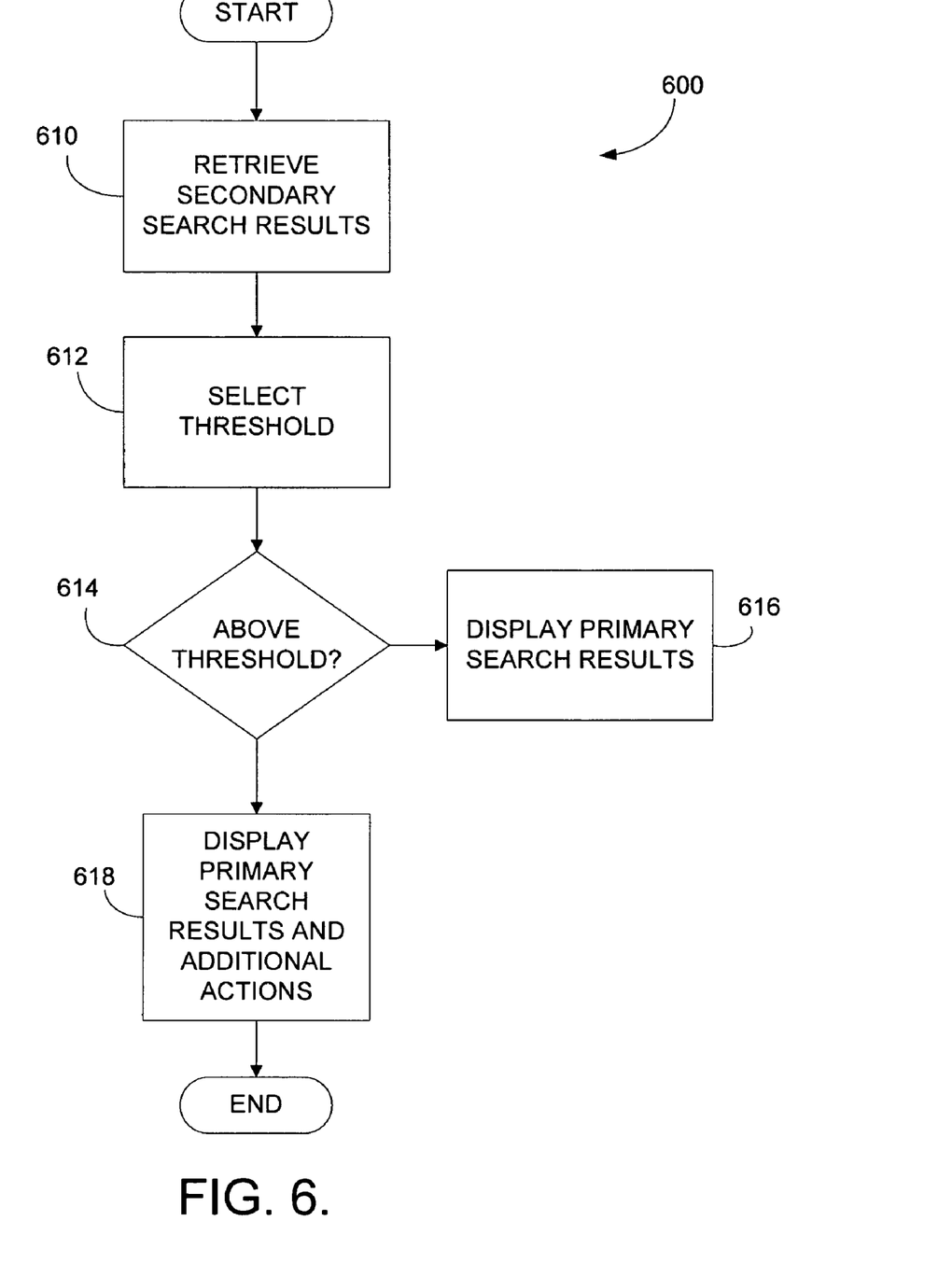
FIG. 6 is a flow chart illustrating one embodiment of a method for selecting enhanced results to display.

Turning to FIG. 6, one embodiment of a method 600 is illustrated wherein the secondary search results generated by methods 400 and 500 are further refined. Method 600 comprises a step 610 where the secondary search results are retrieved. A threshold may be selected and applied at a step 612. The threshold may be a certain percentage of attributes or characteristics of data found in the primary search results. For example, a certain percentage of file types and/or a certain percentage of file properties that should be found in the primary search results before secondary or enhanced search results are rendered. The threshold may be a pre-defined threshold or a dynamic threshold that varies for each performance of method 600. Further, the threshold may be selected from a set of pre-defined thresholds (e.g. 70%, 80%, or 90%) and may vary from attribute to attribute.

At 614, for each attribute that is above the threshold selected at step 612, primary search results and additional actions based on the attributes are rendered at a step 618. Step 618 may comprise additional searches relating to file properties and/or file types. At a step 616, if the secondary search results comprising file properties and file types do not rise above a certain threshold, only the primary search results are rendered.

Figure 7:
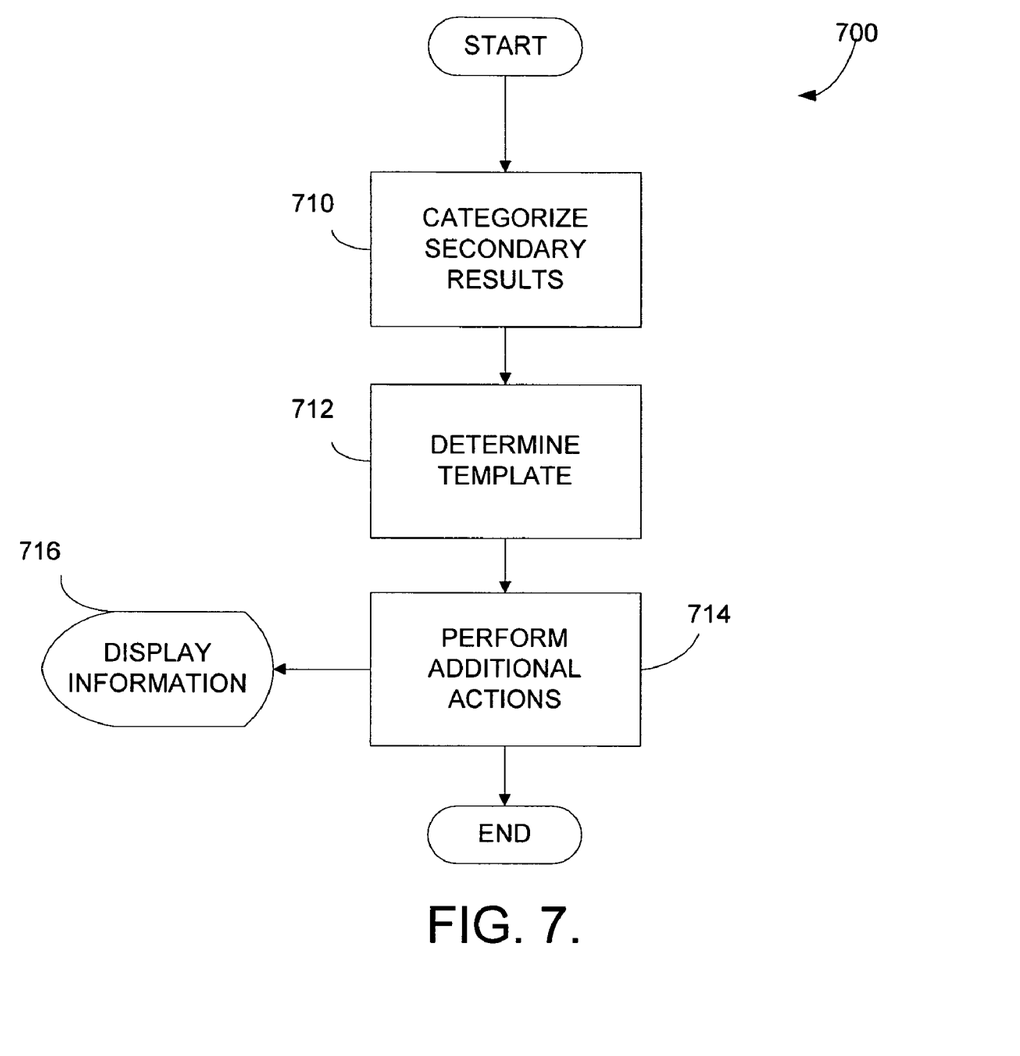
FIG. 7 is a flow chart illustrating one embodiment of a method for displaying enhanced search results on a graphical user-interface.
Figure 8:
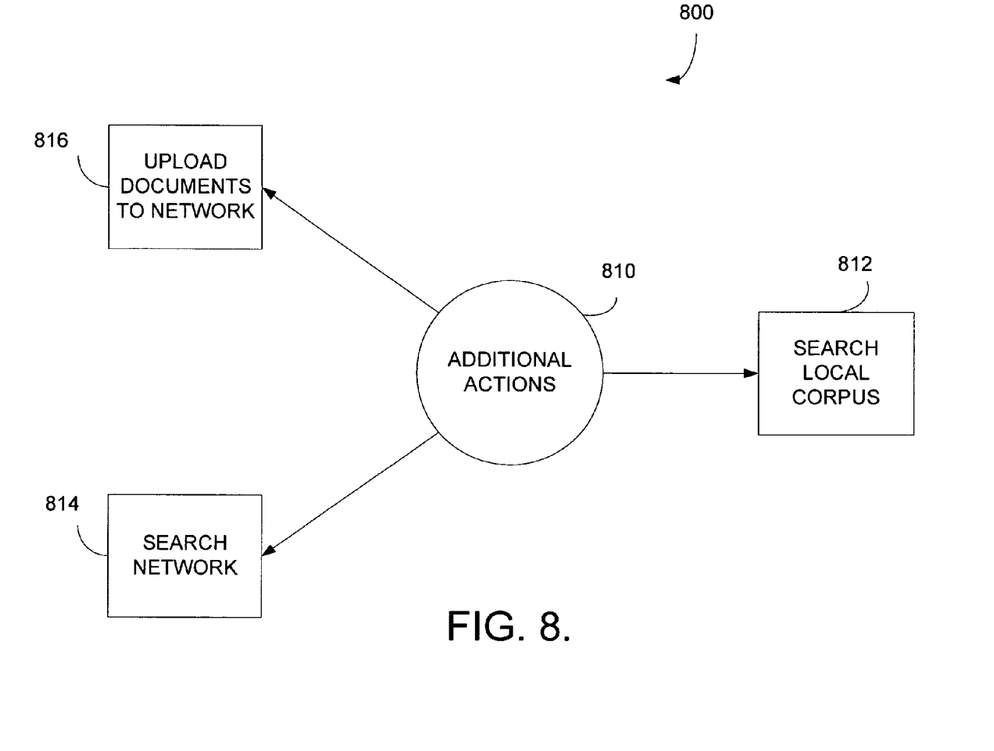
FIG. 8 illustrates exemplary actions that may be used to enhance an initial search.

Referring now to FIG. 7, there is illustrated in greater detail step 618 of FIG. 6 one embodiment of a method 700 for rendering secondary search results. At a step 710, the secondary search results are categorized as to additional searches, additional actions, or information based on the attributes above the threshold that enhance the primary search results. At a step 712, a template is determined which will display the secondary search results in the graphical user interface. The template may be specific to the type of search, such as a network-based search, or a desktop search. At a step 714, additional actions, such as additional searches may be displayed on the appropriate template determined at step 712. Other actions may include, but are not limited to, uploading images residing on a local data store to a network data store. At a step 716, additional information pertaining to the secondary search results which were derived from primary search result's attributes may be similarly displayed on the appropriate template determined at step 712. With reference to relation diagram 800 of FIG. 8, additional actions 810 may include, but are not limited to, a local database search 812, an upload of documents to a network 816, and a network search 814.

Figure 9:
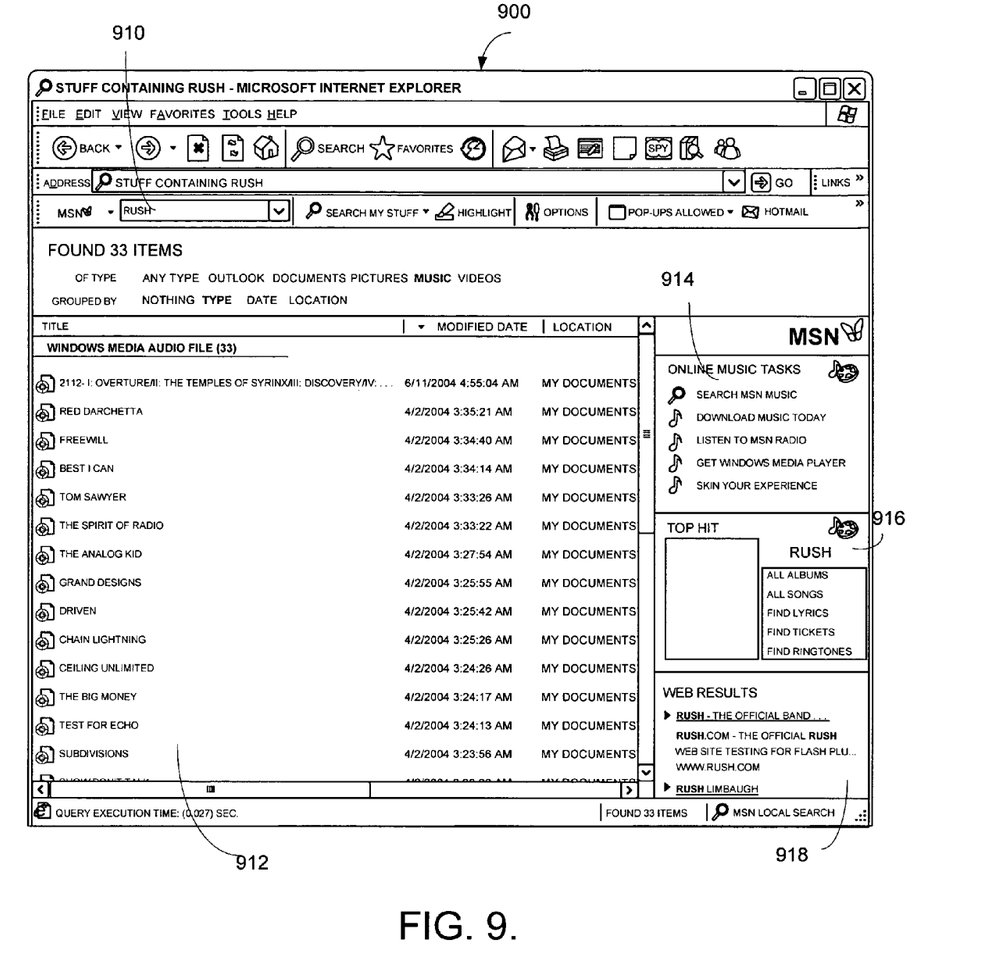
FIG. 9 is an exemplary enhancement of network-based search results.
Figure 10:
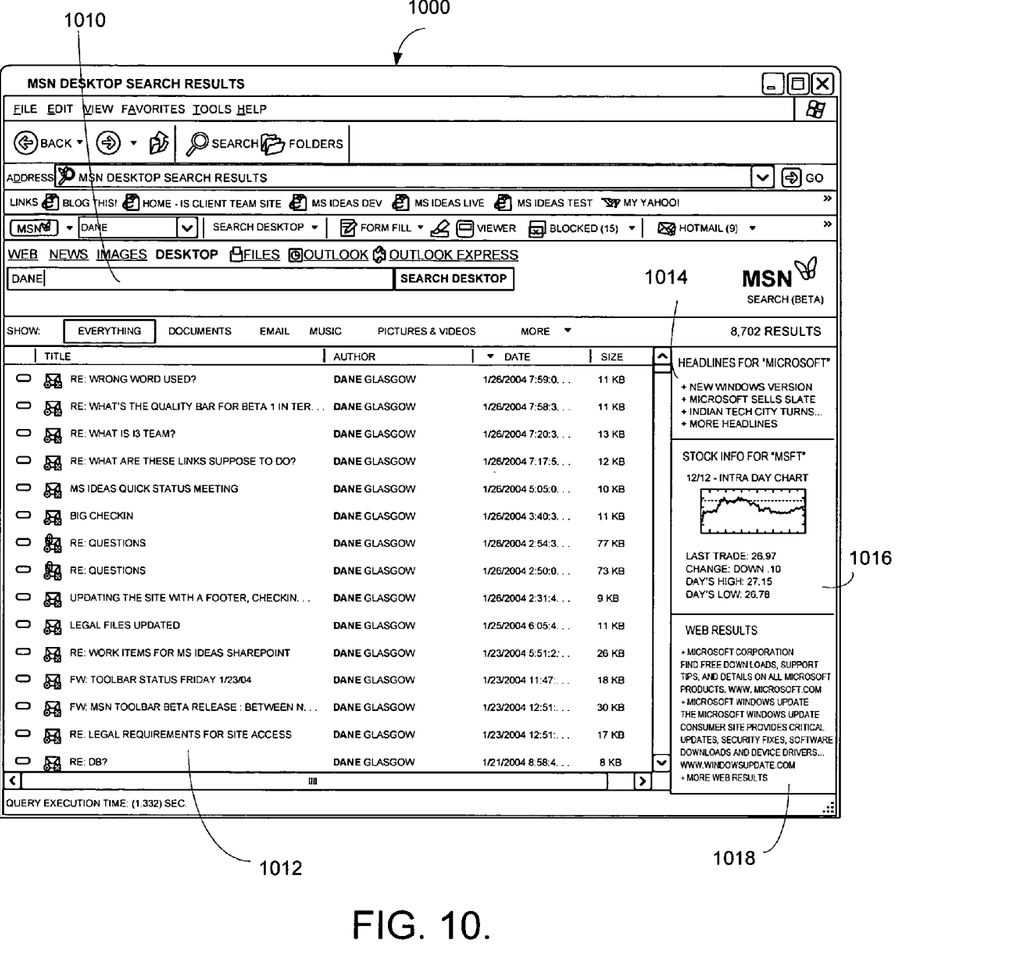
FIG. 10 is an exemplary enhancement of desktop search results.

Referring now to FIGS. 9 and 10 in combination, there are illustrated examples of enhancements of primary searches. Turning to FIG. 9, there is illustrated an exemplary template 900 for displaying network-based search results having a keyword or input data string 910. In this example, "Rush" is an exemplary data string 910. In a portion of a graphical user interface 912, primary search results relating to the data string 910 of "rush" are displayed. From the attributes of the primary search results displayed in portion 912, music file types have been returned in the primary search. In particular, the music files pertain to the rock group "Rush". Based on the attributes of the primary search results, enhanced search results are rendered in portions 914, 916, and 918. Analysis of the primary search results determine that data string 910 returned documents relating to music. Therefore, portion 914 displays additional online music tasks such as searches, downloads, retrieving media players, or listening to music on a radio. Similarly, portion 916 comprises additional secondary search results including songs, albums, lyrics, tickets, and ring tones relating to the rock group "Rush." Portion 918 displays additional search results relating to common file properties of the primary search results based on the common file properties above a threshold. In particular, using the aforementioned noun extraction technique, a common noun occurring in the primary search results was "rush." Thus, secondary search results for the data string "Rush" are rendered.

Turning now to FIG. 10, there is illustrated another example of an exemplary desktop search template 1000 for displaying enhanced search results from an email search. Template 1000 includes a keyword or data string 1010 including the word "DANE". A portion 1012 of template 1000 displays primary search results relating to data string 1010. Similar to FIG. 9, portions 1014, 1016, and 1018 display secondary results derived from the primary results in portion 1012 template 1000. In this example, a secondary search retrieved domain names from e-mail addresses in the primary results rendered in portion 1012. In this instance, Microsoft™ appeared in the domain name. In portion 1014, news relating to Microsoft™ Corporation is displayed. In portion 1016, stock information relating to Microsoft™ is displayed. In portion 1018, an additional search on Microsoft™ Corporation has been performed and results of that search are displayed.

In addition, the aforementioned noun extraction technique may be utilized in conjunction with file type analysis to provide a more comprehensive enhancement of primary search results returned by the initial query. With reference to FIG. 9, the primary search results 912 returned by the initial query or data string 910 may be enhanced based on the common file type being music files above the selected threshold. Thus, a secondary search may be performed using a data string 910 comprising keywords "Rush AND music OR band".

The present invention has been described in relation to particular embodiments, which are intended in all respects to be illustrative rather than restrictive. Alternative embodiments will become apparent to those skilled in the art that do not depart from its scope. Many alternative embodiments exist, but are not included because of the nature of this invention. A skilled programmer may develop alternative means of implementing the aforementioned improvements without departing from the scope of the present invention. It will be understood that certain features and subcombinations are of utility and may be employed without reference to other features and subcombinations and are contemplated within the scope of the claims. Not all steps listed in the various figures need to be carried out in the specific order described. Not all steps of the aforementioned flow diagrams are necessary steps.

What is claimed is:

1. A method for enhancing a search query the method comprising:

receiving at a client computing device a first search query, which is directed to locating search results stored locally on the client computing device;

searching an email application running on the client computing device,
(a) wherein the first search query is used when searching to identify a set of email documents, and
(b) wherein a portion of the set of email documents shares a common domain string in respective email addresses associated therewith;

determining that the portion of the set of email documents comprises a threshold percentage of the set of email documents, wherein the threshold percentage is a dynamic threshold, which is dependent on the common domain string;

when the portion comprises the threshold percentage, extracting the common domain string from the email address;

automatically searching a networked data store that is networked with the client computing device to identify a second set of search results, wherein the common domain string functions as a parameter used to search the networked data store and wherein the second set of search results includes a web page;

presenting the set of email documents in a first portion of a user interface; and enhancing a presentation of the set of email documents by displaying a web-address hyperlink of the webpage in a second portion of the user interface, such that the set of email documents and the web-address hyperlink of the web page are simultaneously displayed.

2. The method of claim 1, wherein the second set of search results comprises at least one of additional actions, searches, and information selected based on one or more characteristics.

3. The method of claim 1, where said client computing device further comprises a graphical user-interface including a display and a user-interface selection device.

4. The method of claim 3, wherein the set of email documents and the web-address hyperlink are rendered in segmented portions of said display.

5. A computer-readable storage medium having computer-executable instructions for performing the method of claim 1.

6. A computerized device comprising a processor and being programmed to perform a method as defined in claim 1.

7. One or more computer-readable storage media having computer-executable instructions embodied thereon that, when executed by a computing device, provide a method of presenting an option to supplement initial search results, the method comprising:

receiving a search query that is submitted by a user;
retrieving from a local data store a first set of email documents that are deemed to satisfy the search query;
displaying the first set of email documents in a first portion of a graphical user interface;
identifying a domain string that is common to a portion of the first set of email document;
determining that the portion of the first set of email documents comprises a threshold percentage of the first set of search results, wherein the threshold percentage is a dynamic threshold, which is dependent on the domain string;
using the domain string as a search parameter to search a networked data store, thereby identifying a second set of search results; and
displaying the second set of search results in a second portion of the graphical user interface, such that the first set of email documents and the second set of search results are simultaneously displayed.

8. The computer-readable storage media of claim 7, wherein said networked data store comprises:

one or more data stores coupled to said computer system through a communications network.

9. The computer-readable storage media of claim 7, wherein the second set of search results includes at least one of a suggested task and a search result based on said attribute.

10. A computerized device comprising a processor and being programmed to perform a method as defined in claim 7.

11. One or more computer-readable storage media having computer-useable instructions embodied thereon that, when executed on a computing device, cause the computing device to perform a method of providing additional selections related to an initial search of a first data store, the method comprising:

receiving a search query that is submitted by a user;
retrieving from a local data store a first set of search results that are deemed to satisfy the search query;
displaying the first set of search results in a first portion of a graphical user interface;
determining that a portion of the first set of search results includes a common media-file type,
wherein the portion is equal to or greater than a predetermined threshold percentage of the first set of search results, and
wherein the predetermined threshold percentage is a dynamic threshold, which is dependent on one or more characteristics that satisfies the predetermined threshold percentage;
using the common media-file type as a search parameter to search a networked data store, thereby identifying a media player that is usable to execute the media-file type; and
displaying an option to download the media player from a networked data store in a second portion of the graphical user interface, such that the first set of search results and the option to download the media player are simultaneously displayed.

12. The media of claim 11, wherein said presentation device further comprises a graphical user-interface including a display and a user-interface selection device and wherein said graphical user-interface includes a first portion for displaying content stored locally on the first computing system and a second portion for displaying content stored on the one or more networked computing system, said graphical user-interface configured to simultaneously display both the content stored locally and the content stored on the one or more networked computers.

* * * * *